US005117921A

United States Patent [19]

Bartels et al.

[11] Patent Number: 5,117,921

[45] Date of Patent: Jun. 2, 1992

[54] HYDRAULICALLY OPERATED HAMMER DRILL

[75] Inventors: Robert-Jan Bartels; Hans-Dieter Piotrowski, both of Essen, Fed. Rep. of Germany

[73] Assignee: Krupp Maschinentechnik GmbH, Essen, Fed. Rep. of Germany

[21] Appl. No.: 750,270

[22] Filed: Aug. 27, 1991

[30] Foreign Application Priority Data

Aug. 27, 1990 [DE] Fed. Rep. of Germany ....... 4027021

[51] Int. Cl.[5] .......................... B23Q 5/00; B25D 9/18

[52] U.S. Cl. ...................................... 173/13; 173/105; 173/200; 173/206; 91/268; 91/272

[58] Field of Search ................ 173/13, 104, 105, 106, 173/116, 119, 131, 134, 138, 139; 91/268, 272, 278, 300

[56] References Cited

U.S. PATENT DOCUMENTS

| | | | |
|---|---|---|---|
| 4,039,033 | 8/1977 | Salmi | 173/105 |
| 4,126,192 | 11/1978 | Wallace | 173/13 |
| 4,355,691 | 10/1982 | Karru et al. . | |
| 4,369,848 | 1/1983 | Salmi et al. . | |
| 4,430,926 | 2/1984 | Wallace | 173/105 |
| 5,010,963 | 4/1991 | Neroznikov et al. | 173/105 |
| 5,056,606 | 10/1991 | Barthomeuf | 173/13 |
| 5,064,003 | 11/1991 | Neroznikov et al. | 173/106 |

FOREIGN PATENT DOCUMENTS

| | | |
|---|---|---|
| 2918630 | 11/1979 | Fed. Rep. of Germany . |
| 0112810 | 7/1984 | Fed. Rep. of Germany . |
| 3023600 | 9/1984 | Fed. Rep. of Germany . |
| 0203282 | 12/1986 | Fed. Rep. of Germany . |
| 3518892 | 2/1987 | Fed. Rep. of Germany . |
| WO89/10465 | 11/1989 | U.S.S.R. . |

*Primary Examiner*—Frank T. Yost
*Assistant Examiner*—Scott A. Smith
*Attorney, Agent, or Firm*—Spencer, Frank & Schneider

[57] ABSTRACT

A hydraulically operated hammer drill includes a housing in which a striking piston is displaceably disposed for alternating movement. The striking piston is driven in striking and return directions by a first operating pressure. A rotatable, tool receiving device is connected to the housing for receiving an insertion end of a drilling tool and permitting displacement of the insertion end in the longitudinal direction when charged by the striking piston. A rotation drive mechanism, driven by a second operating pressure, is mounted for rotatably driving the tool receiving device during longitudinal displacement of the insertion end. A control unit is disposed along a pressure conduit supplying the first operating pressure for alternatingly switching the direction of movement of the striking piston by controlling application of the driving medium to control faces of the striking piston. A first control member is responsive to the second operating pressure for reducing the first operating pressure when the second operating pressure exceeds a first limit value. A second control member varies the magnitude of the expulsion pressure when a second limit value is exceeded, the second limit value being a function of the magnitude of either the first or second operating pressure.

9 Claims, 2 Drawing Sheets

HYDRAULICALLY OPERATED HAMMER DRILL

CROSS REFERENCE TO RELATED APPLICATIONS

The present application claims the rights of priority with respect to application Ser. No. P 40 27 021.1 filed Aug. 27th, 1990 in Germany, the subject matter of which is incorporated herein by reference.

BACKGROUND OF THE INVENTION

The present invention relates to a hydraulically operated, rotary hammer (percussion) drill, particularly for drilling anchor holes (e.g. roof holes, lewis holes, block holes), the drill including a striking piston and a control unit which alternatingly switches the direction of movement of the striking piston. The insertion end of a tool is charged by the striking piston and displaceable in the longitudinal direction of the striking piston as well as driven by means of a rotation mechanism.

A significant field of use for hammer drills is the so-called drilling of anchor holes in which large drill diameters (under certain circumstances including a double rod assembly composed of nested bore hole tubing) and great drilling depths are involved.

A problem that arises in this connection is that if high power consumption occurs at both working units, i.e. the striking mechanism and the rotation mechanism, the transfer elements of the rotation mechanism (drilling tool; insertion end for drilling tool) may become overloaded, even though the hammer drill is generally powerful enough and suitable for such stresses. Moreover, there exists the danger, when drilling with high rotary power, that additionally occurring resistances, due to changes in the material being drilled (for example, working through soft, hard or tough layers) or due to jamming, cause the drill rods to seize up. Such an occurrence results in a considerable amount of time spent to free the drilling rods and possibly in damage to them or their complete loss.

Thus, it is necessary, for the field of use in question, to reduce the energy of each individual stroke of the hammer drill without excessively reducing the number of strokes if the power of the rotation mechanism or its torque rises above a predetermined limit. Too great a drop in the number of strokes generated by the striking mechanism would adversely influence the vibratory behavior of the drilling rods, such vibratory behavior being necessary to overcome the friction between the outer cylinder of the rods and the material being drilled.

Hydraulically operated drilling and striking devices are known from German Pat. No. 2,658,455 in which the energy of each individual stroke can be changed by an externally supplied control pressure while simultaneously changing the number of strokes. The reduction of the energy of each individual stroke is here effected by a step-wise actuated shortening of the stroke of the striking piston connected with an increase in the number of strokes. Used for hammer drills, this type of control has the drawback that the increased number of strokes results in greater wear and friction welding at the already mentioned transfer elements caused by high areal pressures in conjunction with a large number of minute movements in the axial direction. Additionally, the step-wise switching to shorten the working stroke has an adverse effect on the drilling process.

SUMMARY OF THE INVENTION

It is an object of the present invention to provide a hydraulically operated hammer drill such that, once a given limit value has been exceeded, the power of the striking mechanism is reduced smoothly as a function of the load on the rotation mechanism. This simultaneously influences the number of strokes of the striking mechanism so that it does not drop as low as would otherwise be the case.

The above and other objects are accomplished according to the invention by the provision of hydraulically operated hammer drill, comprising: a striking piston housing having a longitudinal bore; a striking piston having control faces and displaceably disposed in the bore of the striking piston housing for alternating movement along a longitudinal axis of the striking piston in a striking direction and in an opposite, return direction, the striking piston being driven in the striking and return directions by a first hydraulic operating pressure and being driven in the return direction against a hydraulic expulsion pressure; a rotatable, tool receiving means connected to the striking piston housing for receiving an insertion end of a drilling tool to be charged by the striking piston and permitting displacement of the insertion end in the longitudinal direction of the striking piston when charged by the striking piston; rotation drive means mounted for rotatably driving the tool receiving means during longitudinal displacement of the insertion end of the drilling tool, the rotation drive means being driven by a second hydraulic operating pressure; an operating pressure conduit for supplying a driving medium to the striking piston with the first hydraulic operating pressure; a return pressure conduit for supplying the striking piston with a pressure free return for the driving medium; switch control means disposed along the pressure conduit for alternatingly switching the direction of movement of the striking piston by controlling application of the driving medium to the control faces of the striking piston; operating pressure control means connected to the pressure conduit and being responsive to the second hydraulic operating pressure of the rotation drive means for reducing the first hydraulic operating pressure driving the striking piston when the second hydraulic operating pressure of the rotation drive means exceeds a first predetermined limit value; and expulsion pressure control means coupled to the hydraulic expulsion pressure for varying the magnitude of the hydraulic expulsion pressure of the striking piston when a second predetermined limit value is exceeded, the second predetermined limit value being a function of the magnitude of one of the first and second hydraulic operating pressures.

The basic concept of the invention is to provide a hammer drill with two control members by way of which the operating pressure driving the striking piston can be influenced so as to reduce the power of the striking mechanism and the expulsion pressure can be influenced against which the striking piston is returned in a direction opposite to the striking direction so as to change the number of strokes of the striking piston. This change can be effected in two ways, namely by charging both control members with the operating pressure of the rotation mechanism, or by charging one of the control members with the operating pressure of the rotation mechanism and the other control member with the operating pressure of the striking mechanism. In th first mentioned embodiment, both control members are directly actuated as a function of the operating pressure of the rotation mechanism as soon as an operating pressure limit value of the driving medium for the rotation mechanism has been exceeded. In the other embodiment, the second (expulsion pressure) control member is actuated as a function of the operating pressure of the striking mechanism as soon as an operating pressure limit value of the drive medium for the striking mechanism has been exceeded. Thus, in this latter case, the second control member is actuated only indirectly as a function of the operating pressure of the rotation mechanism. In each case the first (operating pressure) control member is configured so that, once an operating pressure limit value has been exceeded, it reduces the striking mechanism operating pressure as a function of a rising operating pressure of the rotation mechanism. The second control member is employed to reduce or increase the number of strokes of the striking piston by increasing or reducing, respectively, the expulsion pressure against which the striking mechanism moves on the return stroke when the operating pressure of the striking mechanism or that of the rotation mechanism increases.

The second control member is preferably disposed in a connection channel between the switch control means and the return conduit in a hammer drill that includes, in a known manner, a switch control means in the form of a control slide which, with a constant pressure charge on the smaller, return stroke control face of the striking piston effects the return stroke movement, and alternatingly connects the larger working stroke control face of the striking piston, which is effective in the striking direction, with the pressure conduit or with a return conduit.

Preferably, at least the first control member includes a mechanism for adjusting the operating pressure limit value which causes it to be actuated. This can be effected in a simple manner and with sensitivity by a mechanism that allows an adjustment of a restoring force counteracting the operating pressure to be increased or reduced.

Preferably, the control members are comprised of choke valves by means of which the size of an exit cross section opening into the return conduit can be influenced. For example, an increase in the size of the respective exit cross section results in a drop in the operating pressure of the striking mechanism or of the already mentioned expulsion pressure.

According to a further aspect of the invention, each of the choke valves includes at least one piston which, when charged with pressure, is displaceable against a restoring force by the respective operating pressure.

Preferably, the choke valve constituting the first control member is equipped with a control piston which is displaceable against a restoring element and which resiliently supports a choke piston that delimits the exit cross section. The restoring element for the control piston may here be configured, in particular, as a mechanically active spring element. The displacement of the pressure charged control piston has the result of reducing the spring force attacking the choke piston. The operating pressure limit value which is able to displace the choke piston against a preset spring force and thus further open the exit cross section is thus correspondingly lower. In a preferred embodiment of the first control member, the restoring force of the restoring element for the control piston is adjustable. The control piston therefore performs the corresponding movement only after the operating pressure of the rotation mechanism which charges it has generated a displacement force that exceeds the pre-adjusted restoring force.

Depending on whether the second control member is actuated by way of the operating pressure of the rotation mechanism or of the striking mechanism, it influences the expulsion pressure so that its magnitude increases with decreasing rotation mechanism operating pressure and decreases with decreasing striking mechanism operating pressure and accordingly the number of strokes decreases (when the expulsion pressure is higher) and increases (when the expulsion pressure is lower).

If thus both control members are adjusted directly as a function of the rotation mechanism operating pressure, the increase of the latter to beyond a predetermined limit value results in a parallel reduction of the striking mechanism operating pressure and a further relative increase in the number of strokes.

In the other embodiment, the reduction of the striking mechanism operating pressure results in a relative increase in the number of strokes.

The configuration and resulting mode of operation of the control members must be adapted to the operating conditions to be expected. Unless special circumstances require modifications, the invention may include the following features with respect to the configuration of the two control members:

(1) the first control member should become active only if the load on the rotation mechanism exceeds 50 to 80% of its rated power;

(2) under the influence of the first control member the power of the striking mechanism should be reduced at most by 50% of its rated power; and (3) due to the action of the second control member, the reduction of the striking mechanism power by means of the first control member should result in a relatively higher number of strokes than if the second control member were not employed.

The present invention will now be described in greater detail with reference to several embodiments thereof that are illustrated in the drawing FIGURES.

DETAILED DESCRIPTION OF THE PREFERRED EMBODIMENTS

Figure 1:
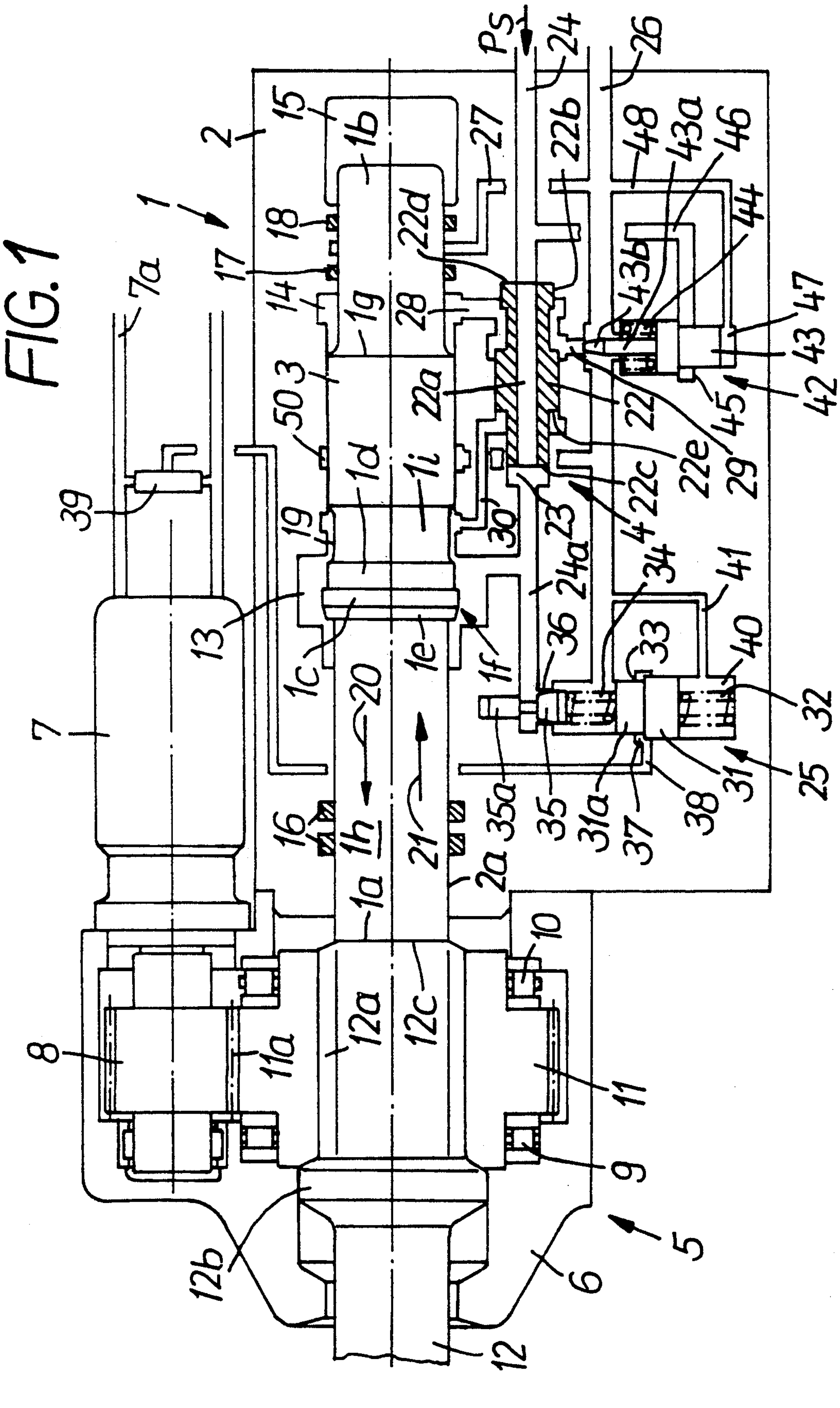
FIG. 1 is a schematic partial sectional view of a hydraulically operated hammer drill which includes as its major component a striking mechanism and a rotation mechanism that cooperates with the striking mechanism.

Referring to FIG. 1, there is shown a hammer drill which includes as its major components a striking mechanism 1 comprising a housing 2, a striking piston 3 that moves back and forth in a longitudinal bore 2*a* of housing 2, a control unit 4 for controlling the alternating movement of striking piston 3, and a rotation mechanism 5 which includes a rotation mechanism housing 6 that is flanged to housing 2. A hydraulic motor 7 is fastened to housing 6 so as to drive in both directions of rotation a drive pinion 8 that is supported in rotation mechanism housing 6.

Rotation mechanism housing 6 is supported by two axial bearings 9 and 10 and further accommodates a thrust bearing 11 in the form of a toothed wheel into whose teeth 11*a* drive pinion 8 engages.

An insertion end 12 for a drilling tool (not shown) is connected with thrust bearing 11 by way of a torque connection in the form of a spline profile 12*a* so as to be movable in the axial direction. The amount of play of the insertion end relative to rotation mechanism housing 6 and thrust bearing 11 is limited by a step 12*b*. Insertion end 12 is caused to rotate under the influence of hydraulic motor 7, drive pinion 8 and thrust bearing 11. Energy generated by striking piston 3 for each individual stroke is transferred to the drill (not shown) Striking piston 3 has a tip 1*a* which impacts an impact surface 12*c* of insertion end 12. Tip 1*a*, impact surface 12*c*, and the faces of spline profile 12*a* are all subjected to considerable stresses.

Within housing 2, three chambers are provided which are separated from one another by striking piston 3, namely (seen in their sequence starting at tip 1*a* of the striking piston) a pressure chamber 13, a reversal chamber 14 and a chamber 15 into which a rear end 1*b* of the striking piston projects to a greater or lesser degree. In the illustrated embodiment, the latter chamber 15 is kept free of pressure. However, if necessary, it may also be filled with compressed gas. Housing 2 is provided with two sealing elements 16 on the side of tip 1*a* of the striking piston and with two sealing elements 17 and 18 in the region between chambers 14 and 15 in order to seal the housing against the environment.

The amount of play for movement of striking piston 3 is limited by an annular projection 1*c* lying in pressure chamber 13. On the side facing rear end 1*b* of the striking piston, annular projection 1*c* changes into a narrower cylindrical section 1*d*. In the direction toward tip 1*a* of the striking piston, annular projection 1*c* is provided with a frustoconical section 1*e* which permits the formation of a pressure cushion to brake the movement of striking piston 3.

Cylindrical section 1*d* is designed with respect to its diameter so that it is able to block a bore section 19 against pressure chamber 13 which follows the former in the direction toward tip 1*a* of the striking piston.

Under the influence of the known control unit 4, striking piston 3 is charged with pressure so that it alternatingly performs a working stroke in a striking direction (arrow 20) or a return stroke in the opposite direction (arrow 21), by way of operating pressure applied to a working stroke control face 1*g* and a relatively smaller return stroke control face 1*f*. Return stroke free 1*f* results from a difference in surface area between cylindrical section 1*d* and a striking piston section 1*h* on the opposite side of annular projection 1*c*.

Control unit 4 is essentially composed of a control slide 22 that is provided with a passage bore 22*a* and is held in a cylinder chamber 23 so as to be movable back and forth in a longitudinal direction of the control slide. Control slide 22 is in communication, by way of cylinder chamber 23, with a pressure conduit 24 and, by way of its extension 24*a*, with pressure chamber 13 During operation, pressure conduit 24 is charged with an operating pressure $P_S$ required for striking mechanism 1 by way of a pressure oil source (not shown).

Through the intermediary of a first control member 25, that will be described below, pressure conduit 24 and its extension 24*a* are in communication with a return conduit 26 that is kept free of pressure A leakage channel 27 which transports leakage oil away from a region between the two sealing elements 17 and 18 also opens into return conduit 26.

Reversal chamber 14 is connectable, in dependence of the position of control slide 22 within cylinder chamber 23, to return conduit 26 by way of a reversal channel 28, cylinder chamber 23 and a connecting channel 29, or to pressure conduit 24 by way of channel 28 and cylinder chamber 23.

Striking piston 3 is charged with pressure in a known manner in that its return stroke face 1*f* is continuously charged with the operating pressure by way of pressure conduits 24, 24*a*. In contrast thereto, the larger working stroke control face 1*g*, which actuates the working stroke, is charged with operating pressure only temporarily whenever control slide 22 is displaced (by performing a movement toward the left) into the other end position (not shown) so as to subject reversal chamber 14 to the operating pressure. The movement of control slide 22 toward the left causes a section 22*b* of the control slide to interrupt the connection between channels 28 and 29 and simultaneously to connect reversal channel 28 to pressure conduit 24.

Control slide 22 has two end faces 22*c* and 22*d* and an annular face 22*e* which together are dimensioned so that control slide 22, in a known manner, takes on the return stroke position shown in FIG. 1 as long as sufficient pressure is charged through channel 30 on annular face 22*e* adjacent to end face 22*c* (as shown in the drawing).

As soon the as the pressure in channel 30 drops, as a function of the position of striking piston 3, control slide 22 is displaced to the left under the influence of the then greater pressure force at end face 22*d* with the already mentioned consequence that charging reversal chamber 14 with the operating pressure initiates the working stroke of the striking piston in the direction of arrow 20. Control slide 22 is thus switched so that, in the course of the return stroke movement, an annular groove 1*i* of the striking piston following cylindrical section 1*d* connects channel 30, by way of a discharge channel 50, with return conduit 26. This results in the already mentioned reduction in pressure at annular face 22*e*.

First control member 25 is basically a choke valve including a control piston 31 disposed in a chamber 40 and which, in its rest position, is held in contact with a contact face 33 under the influence of a restoring spring 32 which has a predetermined restoring force. Through the intermediary of a spring 34, an essentially frustoconical choke piston 35 is supported at a narrower front section 31*a* of control piston 31. Choke piston 35 has a guide composed of a guide stub 35*a* that is movably held in housing 2.

Choke piston 35 is displaceably disposed in an exit opening to pressure conduit extension 24*a* formed by a bore section 36 which also connects to return conduit 26. As long as choke piston 35 lies against the wall of bore section 36 under the influence of spring 34, no exit cross section exists, that is, there is no connection between pressure conduit 24, 24*a* and return conduit 26.

Impact face 33 is part of an annular chamber 37 into which opens a control conduit 38. This control conduit in turn is in communication, by way of a switching valve 39, with the conduit (for example conduit 7*a*) that is charged with the operating pressure for operation of hydraulic motor 7. Thus, without influencing the function of control conduit 38, the hydraulic motor is able to operate in both directions of rotation.

In order to prevent the development of an undesirable counter-pressure in the region of restoring spring 32, chamber 40 accommodating control piston 31 and restoring spring 32 is connected to return conduit 26 by way of a relief channel 41.

If the operating pressure in control conduit 38, due to a stress on rotation mechanism 5, reaches a limit value greater than the restoring force generated by restoring spring 32, control piston 31 is moved away from impact face 33, thus changing the spring force of spring 34 acting on choke piston 35 which is displaced to release an exit cross section between conduits 24*a* and 26. This causes the operating pressure to be reduced, resulting in a decrease in the power of striking mechanism 1. The inventive concept thus results in a reduction in striking power in response to an increase in power at rotation mechanism 5 and thus prevents excess stresses in the region of the transfer elements, that is, in the region of the drill sleeve and the insertion end.

A second control member 42, also in the form of a choke valve is provided in order to influence the number of strokes of striking mechanism 1. Control member 42 is composed of a control piston 43 disposed in a chamber 47 and lying, in its rest position (not illustrated), against an impact face 45 under the influence of a restoring spring 44 having a predetermined restoring force. In the region of impact face 45, control piston 43 can be charged with operating pressure (as illustrated) by way of a control conduit 46 that is connected to pressure conduit 24.

On its side facing restoring spring 44, control piston 43 is provided with a choke pin 43*a* which has a frustoconical end section 43*b* that more or less seals off the cross section of connecting channel 29.

On its side opposite restoring spring 44, chamber 47 is connected by way of a relief channel 48 to return conduit 26 and can thus be relieved of pressure.

Since the position of end section 43*b* relative to connection channel 29 determines the size of the exit cross section into return conduit 26 and thus the expulsion pressure that the striking piston must overcome during the return stroke, a displacement of control piston 43 as a function of the operating pressure for striking mechanism 1 against the force of restoring spring 44 permits a change in the number of strokes of striking piston 3. If the operating pressure in pressure conduit 24 exceeds a given limit value (predetermined by the restoring force of restoring spring 44), the exit cross section in connection channel 29 is reduced by way of control piston 43, thus increasing the expulsion pressure during the return stroke and reducing the number of strokes.

Based on an operating position of control piston 43 brought about by an operating pressure above the associated limit value, a subsequent reduction in the operating pressure results then in an increase of the exit cross section at connection channel 29 and thus in a relatively smaller reduction of the number of strokes.

The cooperation of the two control members 25 and 42 thus ensures that a reduction of the striking mechanism power caused by the rotation mechanism operating pressure results in the desired, less drastic reduction of the number of strokes since, due to the reduced operating pressure of the striking mechanism, a comparatively higher number of strokes results automatically.

Figure 2:
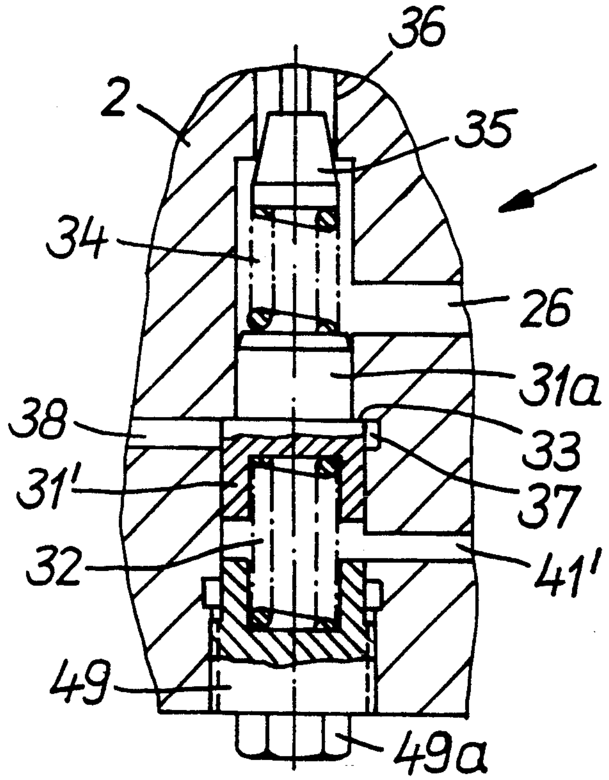
FIG. 2 is a partial sectional view, to a scale that is enlarged compared to FIG. 1, of a different embodiment of the first control member than that illustrated in FIG. 1.

FIG. 2 shows an another embodiment 25' of the first control member in which the predetermined restoring force exerted by restoring spring 32 on a control piston 31' can be smoothly adjusted. For this purpose, restoring spring 32 is supported at housing 2 by way of a threaded sleeve 49 having an external hexagonal head 49*a*. By rotating threaded sleeve 49 in the direction toward control piston 31' which lies against impact face 33, the restoring force of spring 32 can be smoothly increased, thus increasing the operating pressure limit value which, when exceeded, causes control member 25' to respond.

In the embodiment of the first control member shown in FIG. 2, components 31' and 49 are made partially hollow so as to accommodate restoring spring 32 and a relief channel 41' lies in the region between the mentioned components 31' and 49.

Figure 3:
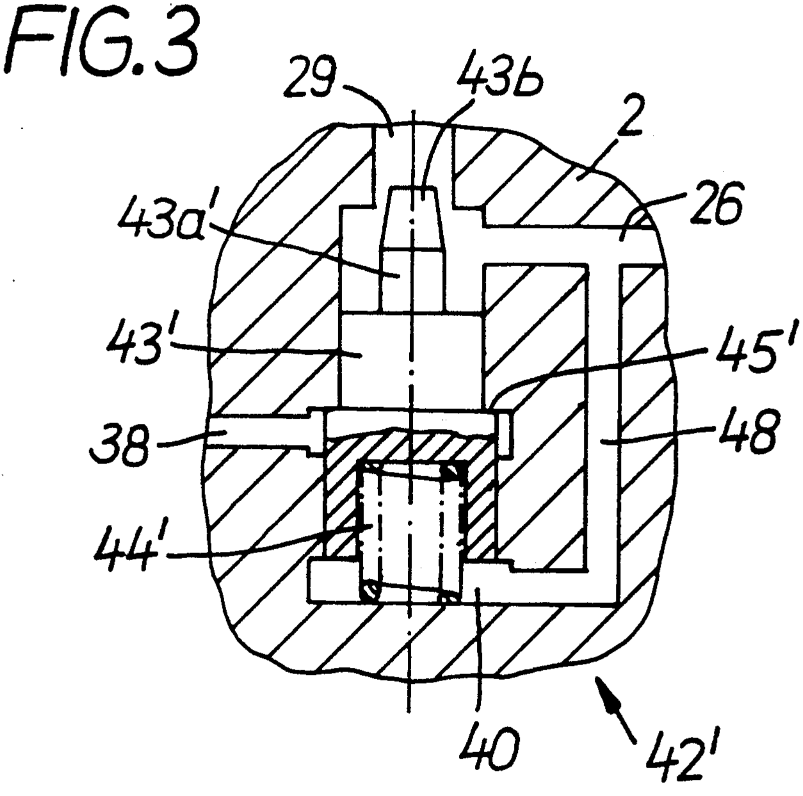
FIG. 3 is a partial sectional view, to a scale that is enlarged compared to FIG. 1, of a different embodiment of the second control member than that illustrated in FIG. 1.

Another embodiment 42' of the second control member is shown in FIG. 3, which in contrast to the embodiment of second control member 42 of FIG. 1, is controlled as a function of the operating pressure for the rotation mechanism once a limit value (given by the predetermined restoring force of restoring spring 44) has been exceeded A control piston 43' is correspondingly connected to control conduit 38 in the same manner as the first control member 25 (shown in FIG. 1).

A restoring spring 44' lies on the side of control piston 43' facing away from choke pin 43*a*'. Control piston 43' is partially hollow for accommodating spring 44'.

The embodiment shown in FIG. 3 can easily be modified, similarly to the embodiment of the first control member shown in FIG. 2, by including a threaded sleeve which permits adjustment of the restoring force of the restoring spring.

The connection of control conduit 38 to control member 42' has the consequence that both the first and second control members are actuated directly as a function of the magnitude of the rotation mechanism operating pressure after a given limit value has been exceeded.

Control member 42' is configured and connected so that a sufficient increase in pressure in control conduit 38 results in a displacement of control piston 43' against the force of restoring spring 44' and an increase in the exit cross section in connection channel 29, and thus a reduction in the expulsion pressure (with a relative rise in the number of strokes).

The advantage realized by the present invention is that, under certain conditions, the power of the striking mechanism is influenced as a function of the load on the rotation mechanism and at the same time the expulsion pressure to be overcome by the striking piston is changed so that the number of strokes is not reduced to an undesirably excessive degree even if the striking power is reduced. A hammer drill configured in this manner is particularly suitable for the drilling of anchor holes and applications involving comparable operating conditions.

Obviously, numerous and additional modifications and variations of the present invention are possible in light of the above teachings It is therefore to be understood that within the scope of the appended claims, the invention may be practiced otherwise than as specifically claimed.

What is claimed is:

1. A hydraulically operated hammer drill, comprising:

a striking piston housing having a longitudinal bore;

a striking piston having control faces and displaceably disposed in the bore of said striking piston housing for alternating movement along a longitudinal axis of said striking piston in a striking direction and in an opposite, return direction, said striking piston being driven in the striking and return directions by a first hydraulic operating pressure and being driven in the return direction against a hydraulic expulsion pressure;

a rotatable, tool receiving means connected to said striking piston housing for receiving an insertion end of a drilling tool to be charged by said striking piston an permitting displacement of the insertion end in the longitudinal direction of said striking piston when charged by said striking piston;

rotation drive means mounted for rotatably driving said tool receiving means during longitudinal displacement of the insertion end of the drilling tool, said rotation drive means being driven by a second hydraulic operating pressure;

an operating pressure conduit for supplying a driving medium to said striking piston with the first hydraulic operating pressure;

a return pressure conduit for supplying said striking piston with a pressure free return for the driving medium;

switch control means disposed along said pressure conduits for alternatingly switching the direction of movement of said striking piston by controlling application of the driving medium to the control faces of said striking piston;

operating pressure control means connected to said pressure conduits and being responsive to the second hydraulic operating pressure of said rotation drive means for reducing the first hydraulic operating pressure driving said striking piston when the second hydraulic operating pressure of said rotation drive means exceeds a first predetermined limit value; and expulsion pressure control means coupled to the hydraulic expulsion pressure for varying the magnitude of the hydraulic expulsion pressure of said striking piston when a second predetermined limit value is exceeded, the second predetermined limit value being a function of the magnitude of one of the first and second hydraulic operating pressures.

2. A device as defined in claim 1, wherein a first one of the control faces of said striking piston is a working stroke control face which causes movement of the striking piston in the striking direction and a second one of the control faces of said striking piston is a relatively smaller return stroke control face which causes the return stroke to be performed and is constantly charged with the first hydraulic operating pressure, said switch control means includes a control slide which, as a function of the position of said striking piston, alternatingly connects said operating stroke control face with said pressure conduit and with said return conduit, said device further includes a connection channel between said switch control means and said return conduit, and said expulsion pressure control means is operatively disposed in said connection channel for varying the expulsion pressure of said striking piston.

3. A device as defined in claim 1, wherein said operating pressure control means includes means for adjusting the first limit value.

4. A device as defined in claim 1, wherein said operating pressure control means and said expulsion pressure control means each include an exit cross section opening into to said return conduit and a displaceable choke valve disposed in said exit cross section for varying the size of the exit cross section.

5. A device as defined in claim 4, wherein said operating pressure control means and said expulsion pressure control means each include a piston couple d to said choke valve for displacing said choke valve, and means for supplying a restoring force for urging said piston in one direction, said piston being displaceable in a direction opposite to said one direction when charged with a hydraulic operating pressure against the restoring force.

6. A device as defined in claim 4, wherein the displaceable choke valve of said operating pressure control means comprises a choke piston, and said operating pressure control means further includes a control piston, means for supplying a restoring force for urging said control piston in one direction, said control piston being couple d to the second hydraulic operating pressure for displacing said control piston in a direction opposite to said on direction against the restoring force, and means resiliently supporting said choke piston with respect to said control piston, with displacement of said control piston controlling displacement of said choke piston by way of said resilient supporting means.

7. A device as defined in claim 6, wherein said operating pressure control means includes means for adjusting the magnitude of the restoring force.

8. A device as defined in claim 1, wherein said expulsion pressure control means is couple d to the first hydraulic operating pressure for increasing the expulsion pressure when the first hydraulic operating pressure exceeds the second limit value.

9. A device as defined in claim 1, wherein said expulsion pressure control means is couple d to the second hydraulic operating pressure for decreasing the expulsion pressure when the second hydraulic operating pressure exceeds the second limit value.

* * * * *